United States Patent
Baldini et al.

(10) Patent No.: US 11,566,369 B2
(45) Date of Patent: Jan. 31, 2023

(54) ELECTRICALLY CONDUCTIVE SIZING FOR CARBON FIBERS

(71) Applicant: Zoltek Corporation, Bridgeton, MO (US)

(72) Inventors: Steven Eric Baldini, Bridgeton, MO (US); David Michael Corbin, Saint Peters, MO (US)

(73) Assignee: ZOLTEK CORPORATION, Bridgeton, MO (US)

( * ) Notice: Subject to any disclaimer, the term of this patent is extended or adjusted under 35 U.S.C. 154(b) by 0 days.

(21) Appl. No.: 17/041,753

(22) PCT Filed: Mar. 28, 2019

(86) PCT No.: PCT/US2019/024557
§ 371 (c)(1),
(2) Date: Sep. 25, 2020

(87) PCT Pub. No.: WO2019/191411
PCT Pub. Date: Oct. 3, 2019

(65) Prior Publication Data
US 2021/0040679 A1    Feb. 11, 2021

Related U.S. Application Data

(60) Provisional application No. 62/649,035, filed on Mar. 28, 2018.

(51) Int. Cl.
*D06M 11/76* (2006.01)
*C01B 32/05* (2017.01)
(Continued)

(52) U.S. Cl.
CPC .............. *D06M 11/76* (2013.01); *B32B 5/26* (2013.01); *B32B 7/12* (2013.01); *B32B 37/12* (2013.01);
(Continued)

(58) Field of Classification Search
CPC .............. C08K 3/042; C08K 2201/011; C08K 2201/001; C08K 9/04; B29C 66/721;
(Continued)

(56) References Cited

U.S. PATENT DOCUMENTS 3,269,883 A    8/1966   Shulver et al.
7,832,983 B2   11/2010  Kruckenberg et al.
(Continued)

FOREIGN PATENT DOCUMENTS

AU    2012374052 B2    9/2013
AU    2012374052 A1    5/2014
(Continued)

OTHER PUBLICATIONS

International Preliminary Report on Patentability for International Application No. PCT/US2019/024557, dated Sep. 29, 2020, 7 pages.
(Continued)

*Primary Examiner* — Camie S Thompson
(74) *Attorney, Agent, or Firm* — RatnerPrestia (57) ABSTRACT

Disclosed herein is an electrically conductive sized fiber including a fiber and a sizing composition adhered to a surface of the fiber, wherein the sizing composition includes at least one sizing compound and a plurality of graphene oxide nanoparticles, The present disclosure also discloses fiber-reinforced resin composites, articles including fiber-reinforced resin composites and methods of making such electrically conductive sized fiber and articles therefrom.

28 Claims, 4 Drawing Sheets

(51) Int. Cl.
   *B32B 5/26*      (2006.01)
   *B32B 7/12*      (2006.01)
   *B32B 37/12*     (2006.01)
   *B32B 37/18*     (2006.01)
   *C08J 3/20*      (2006.01)
   *C08J 5/04*      (2006.01)
   *C08J 5/12*      (2006.01)
   *D06M 23/08*     (2006.01)
   *F03D 1/06*      (2006.01)
   *C08J 5/24*      (2006.01)
   *F03D 80/30*     (2016.01)
   *D06M 101/40*    (2006.01)

(52) U.S. Cl.
   CPC ............ *B32B 37/182* (2013.01); *C01B 32/05* (2017.08); *C08J 3/203* (2013.01); *C08J 5/042* (2013.01); *C08J 5/124* (2013.01); *C08J 5/248* (2021.05); *D06M 23/08* (2013.01); *F03D 1/0675* (2013.01); *B32B 2260/023* (2013.01); *B32B 2260/046* (2013.01); *B32B 2262/106* (2013.01); *B32B 2305/076* (2013.01); *B32B 2305/20* (2013.01); *B32B 2307/202* (2013.01); *B32B 2313/04* (2013.01); *B32B 2603/00* (2013.01); *C01P 2006/40* (2013.01); *D06M 2101/40* (2013.01); *F03D 80/30* (2016.05); *F05B 2280/6003* (2013.01)

(58) Field of Classification Search
   CPC ........ C09J 2463/00; C09J 163/00; C09J 5/02; B29K 2307/04; B29K 2307/202; B29K 2307/302; B29K 2105/251; B29K 2105/162; B29K 2063/00; B82Y 40/00; C01B 32/198; C01B 32/192; B05D 2504/00; B32B 2262/106; B32B 27/38; B32B 27/12; B32B 27/36; B32B 27/40; B32B 7/12; B32B 15/082; B32B 15/095; B32B 2255/10; B32B 2255/20; B32B 2260/021; B32B 2260/046; B32B 2264/10; B32B 2264/188; B32B 5/26; C08J 7/043; C08J 9/40; C08J 2375/04; C08J 2463/00; C08J 5/24; C08J 5/042; C08J 5/06; D06M 2101/40; D06M 23/108; D06M 11/73; D06M 11/76

USPC ............ 252/500; 428/300.1, 668, 413, 332; 423/448, 323; 442/294; 156/181
   See application file for complete search history.

(56) References Cited

U.S. PATENT DOCUMENTS

| | | |
|---|---|---|
| 2009/0227162 A1 | 9/2009 | Kruckenberg et al. |
| 2011/0001086 A1 | 1/2011 | Kruckenberg et al. |
| 2011/0305904 A1 | 12/2011 | Vickery et al. |
| 2014/0306164 A1 | 10/2014 | Restuccia et al. |
| 2015/0166743 A1 | 6/2015 | Restuccia et al. |
| 2015/0218392 A1 | 8/2015 | Crain et al. |
| 2016/0193751 A1 | 7/2016 | Humfeld |

FOREIGN PATENT DOCUMENTS

| | | | |
|---|---|---|---|
| AU | 2014384605 A1 | | 6/2016 |
| CN | 101484628 A | | 7/2009 |
| CN | 101641303 A | | 2/2010 |
| CN | 102785437 A | | 11/2012 |
| CN | 104264484 | * | 1/2015 |
| CN | 101565893 B | | 5/2015 |
| CN | 105176008 | * | 12/2015 |
| CN | 105968718 A | | 9/2016 |
| EP | 2022886 B1 | | 10/2013 |
| EP | 2660385 A1 | | 11/2013 |
| EP | 2687364 A1 | | 1/2014 |
| EP | 2013408 B2 | | 9/2016 |
| EP | 3080196 A2 | | 10/2016 |
| JP | 2009535530 A | | 10/2009 |
| WO | 2007130979 A2 | | 11/2007 |
| WO | 2008048705 A2 | | 4/2008 |
| WO | 2008048705 A3 | | 4/2008 |
| WO | 2013141916 A2 | | 9/2013 |
| WO | 2013141916 A3 | | 9/2013 |
| WO | 2014210584 A1 | | 12/2014 |
| WO | 2015130368 A2 | | 9/2015 |

OTHER PUBLICATIONS

International Search Report and Written Opinion for International Application PCT/US2019/024557, dated Jul. 16, 2019, 9 pages.
Chinese Office Action for Chinese Application No. 201980033789. 1, dated Apr. 18, 2022, with translation, 15 pages.

* cited by examiner

ELECTRICALLY CONDUCTIVE SIZING FOR CARBON FIBERS

CROSS-REFERENCE TO RELATED APPLICATIONS

This Application is a national stage application under 35 U.S.C. § 371 of International Application No. PCT/US2019/024557, filed Mar. 28, 2019, which is related to, and claims the benefit of priority of U.S. Provisional Application No. 62/649,035, entitled ELECTRICALLY CONDUCTIVE SIZING FOR CARBON FIBERS, filed on Mar. 28, 2018, the contents of each of these applications are incorporated herein by reference in their entireties for all purposes.

FIELD OF THE INVENTION

The present disclosure relates generally to electrically conductive sized fiber including a fiber and a sizing composition adhered to a surface of the fiber, wherein the sizing composition includes at least one sizing compound and a plurality of graphene oxide nanoparticles. The present disclosure also relates generally to fiber-reinforced resin composite including electrically conductive sized fibers, articles including fiber-reinforced resin composites and methods of making such electrically conductive sized fibers.

BACKGROUND OF THE INVENTION

In general, the fiber-reinforced resin composites display good longitudinal electrical conductivity, but poor through-thickness transverse electrical conductivity. Hence, there is a need for an improved fiber-reinforced resin composite with improved through-thickness transverse electrical conductivity.

SUMMARY OF THE INVENTION

In an aspect, there is an electrically conductive sized fiber comprising a fiber, and a sizing composition adhered to a surface of the fiber, wherein the sizing composition comprises at least one sizing compound and a plurality of graphene oxide nanoparticles.

In another aspect, there is a method comprising the steps of:
a) coating a sized or an un-sized fiber tow with a sizing composition by drawing the sized or the un-sized fiber tow through a sizing bath containing the sizing composition such that the sized or the un-sized fiber tow is immersed in the sizing composition to form a coated fiber tow, wherein the sizing composition contained in the sizing bath includes at least one sizing compound and a plurality of graphene oxide nanoparticles;
b) drying the coated fiber tow to form an electrically conductive sized fiber tow including the fiber and the sizing composition adhered to a surface of the fiber; and
c) spooling the electrically conductive sized fiber.

In yet another aspect, there is a fiber-reinforced resin composite comprising:
  a) an electrically conductive sized fiber reinforcement including
    i) a fiber, and
    ii) a sizing composition adhered to a surface of the fiber, wherein the sizing composition includes at least one sizing compound and a plurality of graphene oxide nanoparticles; and
  b) a binder resin.

In yet another aspect, there is an article comprising at least two components adhesively bonded to each other, wherein at least one of the at least two components comprises the fiber-reinforced resin composite, as disclosed hereinabove.

In another aspect, there is a spar cap comprising a fiber-reinforced resin composite comprising:
  a) an electrically conductive sized fiber reinforcement including
    i) a fiber, and
    ii) a sizing composition adhered to the surface of the fiber, wherein the sizing composition comprises at least one sizing compound and a plurality of graphene oxide nanoparticles; and
  b) a binder resin.

BRIEF DESCRIPTION OF THE DRAWINGS

The accompanying drawings, which are incorporated in and constitute a part of this specification, illustrate one (several) embodiment(s) of the invention, and together with the written description, serve to explain certain principles of the invention.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The wind energy industry requires lightning protection for the blades in which carbon fiber-reinforced resin composites have been commonly used for the spar caps. Due to the strong anisotropy of the electrical conductivity of the carbon fibers and uni-directional planar tow form of these carbon fiber-reinforced resin composites, the lengthwise conductivity of these carbon fiber-reinforced resin composites can be four orders of magnitude higher than transverse conductivity. Hence, as a result of this anisotropy, when a lightning strike, the high energy electricity would flow lengthwise, but would arc transversely, which could result in elevation in temperature, and thereby can cause delamination or incineration of the spar cap. Therefore, it has been discovered that there is a need to effectively enhance the through-thickness transverse electrical conductivity of the carbon fiber-reinforced resin composites forming the spar cap. It has been contemplated to increase the electrical conductivity of materials by various techniques, such as:

- Inclusion of conductive particles into the resin directly. However, there may be several disadvantages associated with this process in some circumstances such as, for example, difficulty of mixing conductive particles into the resin, which can result in viscosity changes that can affect the performance of an infusion process. Furthermore, if the conductive particles are nano-particles, there may be an airborne hazard if handled improperly.
- Inclusion of conductive particles into a thermoplastic pellet and subsequent inclusion into composite. This technique can add to the cost of manufacturing and there is always risk of incompatibility with the composite resin.
- Plasma spraying the conductive particles onto the surface of the fibers can introduce a new step in the process.
- Creating films for inclusion of conductive particles into a composite laminate raises several issues, especially it is very difficult or impossible to do in a pultrusion process or in an infusion process. Furthermore, this provides for only surface treatment and thus does not provide solution to the problem of providing conductivity through the entire cross-section.

To the extent that these approaches have various issues, alternative approaches may be more efficient and cost effective for enhancing the electrical conductivity of the carbon fiber-reinforced resin composite.

Disclosed herein is an electrically conductive sized fiber, a fiber-reinforced resin composite, articles including such electrically conductive sized fiber and fiber-reinforced resin composite and methods of making thereof.

In an aspect, there is an electrically conductive sized fiber including a fiber and a sizing composition adhered to a surface of the fiber. In such an embodiment, the sizing composition can include at least one sizing compound and a plurality of graphene oxide nanoparticles. In an embodiment, the sizing composition is substantially free of graphene nanoparticles.

As used herein, the term substantially free of graphene nanoparticles means that the graphene nanoparticles are not added to the sizing composition, but may be present as an impurity in a minor amount along with graphene oxide nanoparticles.

As used herein, the term "graphene oxide" refers to an oxidized derivative of graphene, with a resultant hydrophilic nature and colloidal stability in aqueous media. Furthermore, as used herein, the term "graphene oxide" does not include graphene, graphyne and graphone.

Graphyne is a two-dimensional carbon allotrope of graphene with honeycomb structure and directional electronic properties. Graphone is a hydrogenated derivative of graphene and is more useful for nanoelectronics and spintronics. Graphene composition is largely dependent upon the purity of the graphite from which it was produced, as it is, by definition (Webster) "an extremely electrically conductive form of elemental carbon that is composed of a single flat sheet of carbon atoms arranged in a repeating hexagonal lattice"—so although the intent is pure carbon (C), but impurities such as oxygen (O) may be present. Thus, while graphyne, graphone and graphene are hydrophobic, graphene oxide is hydrophilic in nature.

The graphene oxide (GO) is typically produced directly from graphite through the use of strong oxidizing agents and concentrated acids using Hummer's Method (Hummers, William S.; Offeman, Richard E., "Preparation of Graphitic Oxide". *Journal of the American Chemical Society*, 1958, 80 (6): 1339). The typical graphene oxide (GO) from Hummer's Method contains a variety of functional groups in attached to the hexagonal carbon sheet, including carboxylic groups (O—C—O), carbonyls (C=O), epoxides (C—O—C), hydroxyls (C—OH), and others. For example, the GO can be produced by a wet-milling process, resulting in an edge-functionalized version with carboxylic (O—C—O) and hydroxyl (C—OH) functionalities.

A composition of an exemplary graphene oxide available from Graphen-AD has 72.5% carbon, 21% oxygen, 0.4% sulfur, 1.2% hydrogen and 4.9% nitrogen and another exemplary composition of graphene oxide available from Garmor has 90-95% carbon and corresponding 5-10% oxygen, without the other impurities.

Figure 8:
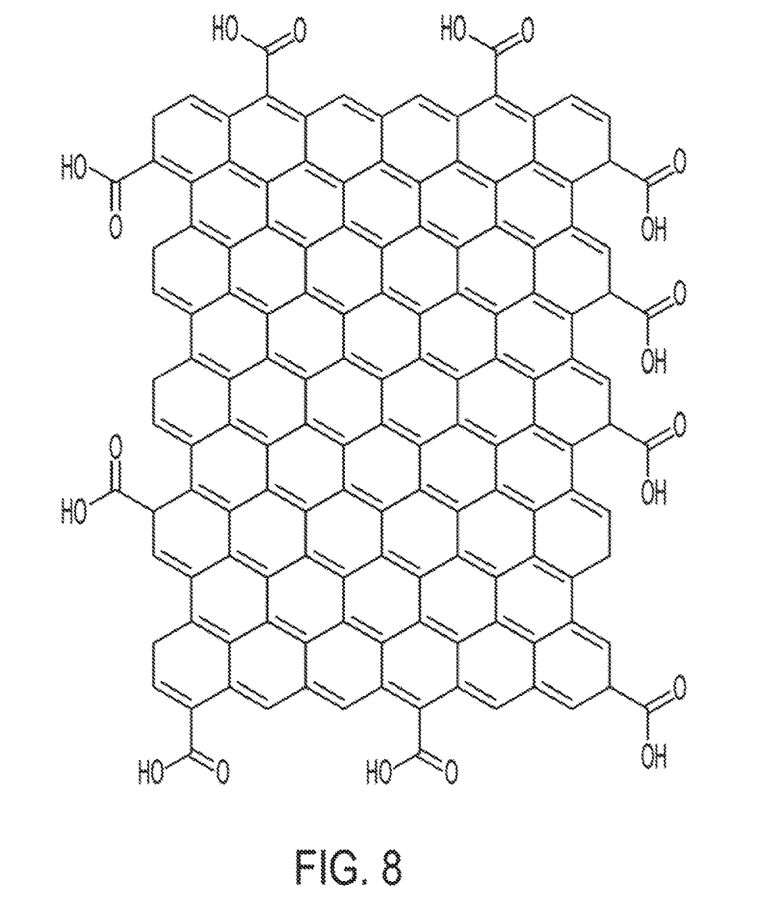
FIG. 8 shows a schematic drawing of an edge oxidized graphene oxide nanoplatelet (GONP).

In an embodiment, the graphene oxide nanoparticles are in the form of graphene oxide nanoplatelets (GONP). In another embodiment, the graphene oxide nanoparticles are edge oxidized graphene oxide nanoplatelets (GONP), as shown in FIG. 8. The graphene oxide nanoplatelets can have a particle size distribution in the range of 200 nm to 1 μm or 200 nm to 800 nm with an average size in the range of 400 nm to 500 nm and thickness in less than 5 nm. The graphene oxide nanoplatelets have an average aspect ratio in the range of 90-1.

The sizing composition may include graphene oxide nanoparticles in an amount in the range of 0.1-25%, or preferably 1-20%, or more preferably 2-15% by weight, based on the total solid content of the sizing composition. In an embodiment, graphene oxide may be present in the sizing composition in an amount of at least, 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10% by weight and at most of 25%, 24%, 23%, 22%, 21%, 20%, 19%, 18%, 17%, 16%, 15%, 14%, 13%, 12%, 11%, or 10% by weight, based on the total solid content of the sizing composition. As used herein, the term "solid content of the sizing composition" refers to the total amount of plurality of graphene oxide nanoparticles and at least one sizing compound.

The sizing composition may include at least one sizing compound from among film formers, coupling agents, and processing aids. The film formers play a vital role in protecting the fibers from abrasion and may be present in an amount in the range of 50-99.9%, or 70-95%, or 85-95% by weight, based on the total solid content of the sizing composition. Suitable examples of film formers include, but are not limited to polyvinyl acetate, epoxy, polyester, polyurethane, etc. Suitable examples of coupling agents include, but are not limited to, chromium (III) methacrylate (available as Volan® from Zaclon LLC), chromium (III) methacrylate, silanes, titanates, etc. Suitable examples of processing aids include, but are not limited to, lubricants, wetting agents, neutralizing agents, antistatic agents, antioxidants, nucleating agents, cross-linkers, and any combination thereof.

In an embodiment, the sizing composition further includes an aqueous in solvent, such that the at least one sizing compound and a plurality of graphene oxide nanoparticles are dispersed in the aqueous solvent, thereby forming an aqueous dispersion. The aqueous solvent may be present in an amount in the range of 75-95%, or 85-95%, or 90-95% by weight based on the total weight of the sizing composition.

Figure 4:
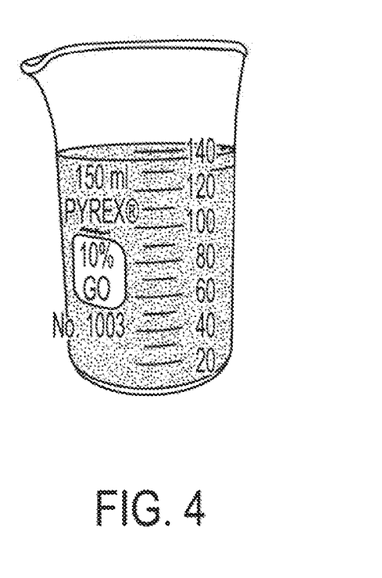
FIG. 4 shows a picture of a sizing composition comprising at least one sizing compound and a plurality of graphene oxide nanoparticles, after standing over a period of one week.

In another embodiment, the sizing compositions of the present invention have a long, useful shelf life, as compared to most aqueous dispersions, which have very limited shelf lives. FIG. 4 shows a picture of a sizing composition comprising at least one sizing compound and a plurality of graphene oxide nanoparticles, being stable after standing over a period of 1 week. In an embodiment of the present invention, the sizing composition can be non-hazardous and imposes no environmental effect when disposed of as compared to most aqueous dispersions, the disposal of which incurs expensive disposal fees.

The electrically conductive sized fiber can include any suitable fiber, including, but not limited to, carbon fibers. In an embodiment of the electrically conductive sized fiber of the present invention, the fiber is a polyacrylonitrile (PAN)-based carbon fiber. The electrically conductive fiber can be in any suitable form including, but not limited to, a dry tow, a fabric, a felt, a scrim, a prepreg with thermoplastic or thermosetting resin, a pultruded plate, or a sheet molding compound. In an embodiment, the electrically conductive sized fiber has a sizing composition in an amount (also referred to as sizing level) in the range of 0.1-5%, 0.5-2.5%, or 1.0-2.0%, by weight, based on the total amount of fiber and sizing composition after drying.

In an embodiment, the carbon fibers have an electrical resistivity of about 0.00155 Ohm-cm. The carbon fibers can have an average diameter in the range of 5-10 microns, and any suitable length. In an embodiment, milled carbon fibers can have an average diameter of 7.2 microns.

The carbon fiber can have any suitable tow bundle size, including, but not limited to, at least 3 k, 6 k, 12 k, 24 k, 50 k or 60 k.

Suitable examples of commercially available carbon fibers include, but are not limited to: PX35 available from Zotek, TORAYCA® T700 and T800, all available from Toray, SIGRAFIL available from SGL, Grafi available from Mitsubishi, AKSAKA available from DowAksa, Tenax available from Toho.

Method of Making an Electrically Conductive Sized Fiber and Articles Therefrom

In an aspect, there is a method for manufacturing an electrically conductive sized fiber; the electrically conductive sized fiber comprising a fiber and a in sizing composition adhered to a surface of the fiber, wherein the sizing composition includes at least one sizing compound and a plurality of graphene oxide nanoparticles.

Figure 2:
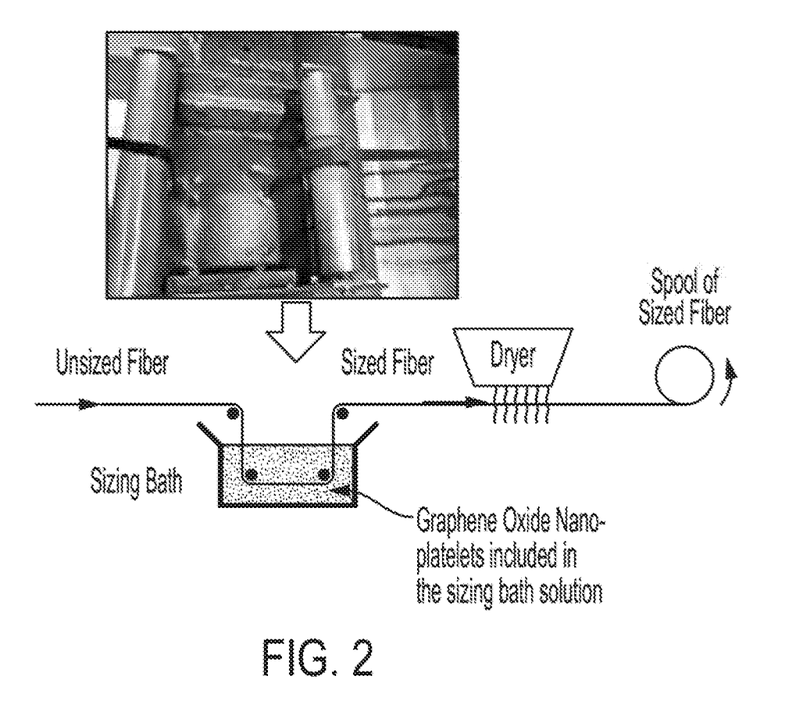
FIG. 2 shows a schematic diagram of a method of making an electrically conductive sized fiber, in accordance with various embodiments of the present invention.

FIG. 2 shows an exemplary method comprising the step of first providing a sizing composition comprising at least one sizing compound and plurality of graphene oxide nanoparticles, followed by coating a sized or an un-sized fiber tow with the sizing composition by drawing the sized or the un-sized fiber tow through a sizing bath containing the sizing composition such that the sized or the un-sized fiber tow is immersed in the sizing composition to form a coated fiber tow. The sizing composition contained in the sizing bath can include at least one sizing compound and a plurality of graphene oxide nanoparticles. As shown in FIG. 2, the method can further include the step of drying the coated fiber tow to form an electrically conductive sized fiber tow including the fiber and the sizing composition adhered to a surface of the fiber, the sizing composition includes the at least one sizing compound and the plurality of graphene oxide nanoparticles. The step of drying can be carried out at a temperature in the range of 100-150° C., or 110-140° C., or 120-130° C. for an amount of time in the range of 1-15 minutes, or 3-12 minutes, or 4-6 minutes, in air, inert atmosphere like nitrogen, argon, etc, or under vacuum. In an embodiment, the drying step can be carried out in a forced air, multi-zone, such as a 2-zone continuous oven. In another embodiment, the drying step can be carried out at for example around 180° C. for about 5 minutes in forced air/2-zone continuous oven. The method also includes a step of spooling the electrically conductive sized fiber.

Figure 3:
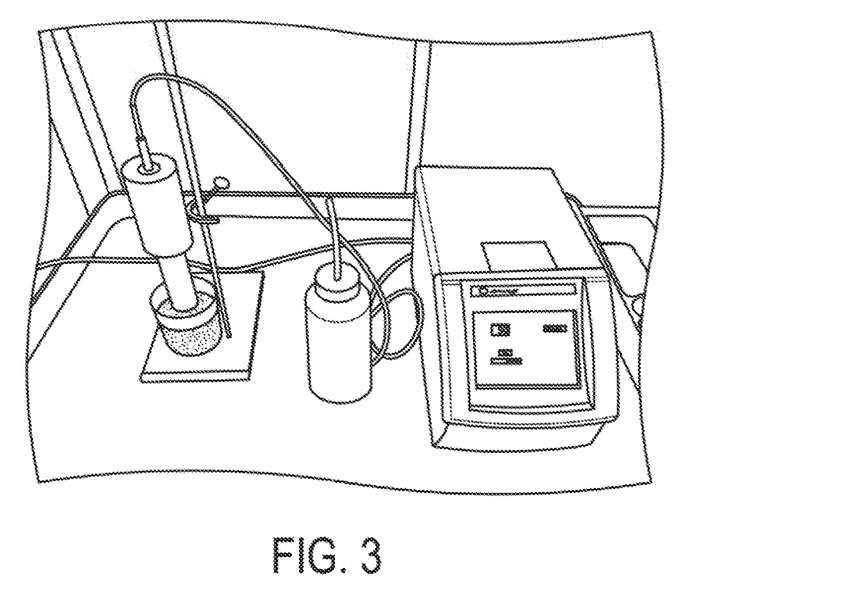
FIG. 3 shows a picture of a set-up of re-dispersing graphene oxide nanoparticles in an aqueous dispersion by sonication before the step of adding the dispersion in the sizing composition, in accordance with various embodiments of the present invention.

In an embodiment, the step of providing a sizing composition comprises adding a plurality of graphene oxide nanoparticles in solid form to at least one sizing compound. In another embodiment, the step of providing a sizing composition comprises adding an aqueous dispersion of the plurality of graphene oxide nanoparticles to at least one sizing compound. In yet another embodiment, the method may further include re-dispersing graphene oxide nanoparticles in the aqueous dispersion by any suitable mechanical means, such as sonication including horn sonication or bath sonication, and high speed shear mixing, before the step of adding the graphene oxide dispersion to the sizing composition, as shown in FIG. 3. The amount of time required for re-dispersing graphene oxide nanoparticles will depend upon the graphene oxide composition and the mechanical means and can be in the range of 5 seconds to 30 minutes, or preferably 15 to 20 minutes.

In an aspect, the method further comprises forming a fiber-reinforced resin composite in the form of a pultruded sheet or a resin-infused fabric, or a pre-impregnated tape (prepreg, impregnated with a thermoplastic resin or a thermosetting resin), or a sheet molding compound (SMC). In an embodiment, the step of forming a fiber-reinforced resin composite can include arranging the electrically conductive sized fiber into a fabric and infusing the fabric with a binder resin to form a resin infused fabric or a prepreg. In another embodiment, the step of forming a fiber-reinforced resin composite can include arranging the electrically conductive sized fiber into a planar tow form, infusing the planar tow form with a binder resin and pultruding the resin infused planar tow form to form a pultruded sheet.

Figure 9:
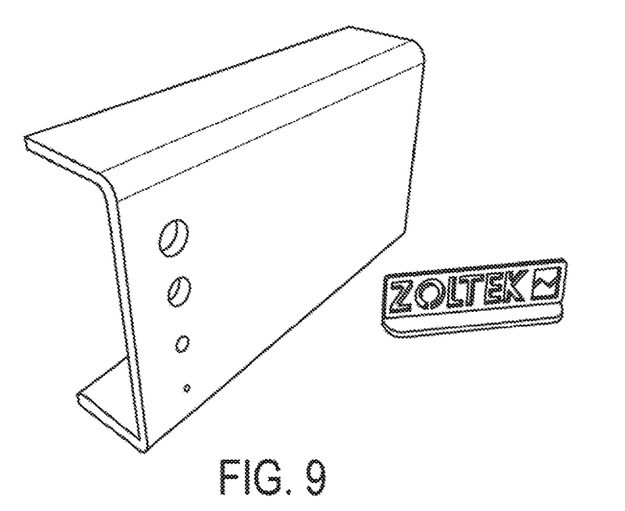
FIG. 9 shows a picture of an exemplary C-section, in accordance with various embodiments of the present invention.

In another embodiment, the step of forming a fiber-reinforced resin composite can include arranging a combination of electrically conductive sized fiber and fabric made with electrically conductive sized fiber into a structural cross section form, infusing the structural cross section form with a binder resin and pultruding the resin infused section form to result in a pultruded structural section (for example a C-section, J-section, or Pi-section). FIG. 9 shows a picture of an exemplary C-section, in accordance with various embodiments of the present invention.

In another embodiment, the step of forming a fiber-reinforced resin composite can include compounding at least one of a plurality of chopped or a plurality of continuous electrically conductive sized fibers with a binder resin and compression molding or injection molding the resulting composition into an article.

In another aspect, the method can further include forming an article by adhesively bonding at least two components to each other. In such an embodiment, at least one of the at least two components can include the fiber-reinforced resin composite, as disclosed hereinabove.

In an embodiment, the electrically conductive sized fiber of the present invention is suitable for use in wind blade applications.

Fiber-Reinforced Resin Composite

In an aspect, there is a fiber-reinforced resin composite including the electrically conductive sized fiber, as disclosed hereinabove and a binder resin.

In an embodiment of the fiber-reinforced resin composite, the fiber is a carbon fiber.

The fiber-reinforced resin composites according to the present invention may be formed from and based on any binder resin known in the art.

Non-limiting examples of a binder resin that is a thermoset (co)polymer includes unsaturated polyesters, epoxy resins, vinyl ester resins, phenolic resins, thermoset polyurethanes, polyimides, bismaleimide resins, benzoxazine resins, and silicone resins.

Non-limiting examples of a binder resin that is a thermoplastic (co)polymer includes, polyolefins, cyclic polyolefins, acrylonitrile butadiene styrene, polyvinyl chloride, polystyrene, thermoplastic polyesters, polyvinyl alcohols, polymethyl methacrylates, styrene maleic anhydrides, polyoxymethylene (acetals), thermoplastic polyurethanes, polyethylene terephthalates, polytrimethylene terephthalates, polybutylene terephthalates, polyamides, polycarbonates, polyvinylpyrrolidone, polytetrafluoroethylene, polysulfones, polyethersulfones, polyphenylene sulfides, polyetherimides, polyamide-imides, polyetheretherketones, and polyaryletherketones, including alloys and blends.

In an embodiment, the fiber-reinforced resin composite is in the form of a pultruded sheet, a fabric, or a prepreg. In another embodiment, the fiber-reinforced resin composite in the form of a pultruded sheet includes carbon fibers in a planar tow form fused with the binder resin. In yet another embodiment, the fiber-reinforced resin composite in the form of a fabric includes a multidirectional fabric, a unidirectional fabric or a woven fabric.

In an embodiment, the fiber-reinforced resin composite includes at least one of 20-80% by volume of electrically conductive sized carbon fiber reinforcement and a vinyl ester resin, 20-80% by volume of electrically conductive sized fiber reinforcement and a polyester resin or 20-80% by volume of electrically conductive sized carbon fiber reinforcement and an epoxy resin, where the amount in % by volume is based on the total volume of the fiber-reinforced resin composite. In an embodiment, the fiber-reinforced resin composite is in the form of a pultruded sheet, a resin-infused fabric, a pre-impregnated tape, or a sheet molding compound. In the pultruded form, the electrically conductive sized fiber may be present in an amount in the range of 40-80%, or preferably 60-72%, by volume, based on the total volume of the fiber-reinforced resin composite. In the pultruded form, the electrically conductive sized fiber may be present in an amount in the range of 40-80%, or preferably 60-72%, by volume, based on the total volume of the fiber-reinforced resin composite. In the prepreg form, the electrically conductive sized fiber may be present in an amount in the range of 40-80%, or preferably 54-61%, by volume, based on the total volume of the fiber-reinforced resin composite. In the resin-infused fabric form, the electrically conductive sized fiber may be present in an amount in the range of 40-80%, or preferably 48-59%, by volume, based on the total volume of the fiber-reinforced resin composite.

In an embodiment, the fiber-reinforced resin composite in the form of a pre-impregnated tape comprises a preimpregnated unidirectional sheet of fibers or a preimpregnated fabric, where the fabric is one or more of a multidirectional fabric, a unidirectional fabric or a woven fabric.

In an embodiment, the fiber-reinforced resin composite in the form of a sheet molding compound comprises plurality of continuous or discontinuous carbon fibers, a multidirectional fabric, a unidirectional fabric, a woven fabric, or a non-woven in fabric, combined with a binder resin.

The fiber-reinforced resin composite may also include any filler and/or particle, known in the art for reinforcing composites, such as polymer composites. Examples of such particles include, but are not limited to, talc, calcium carbonate, aluminum hydroxide, titanium oxides, and silica.

Article

In another aspect, there is an article comprising at least two components adhesively bonded to each other, where at least one of the at least two components includes the fiber-reinforced resin composite, as disclosed hereinabove, including the electrically conductive sized fiber of the present disclosure.

Figure 5:
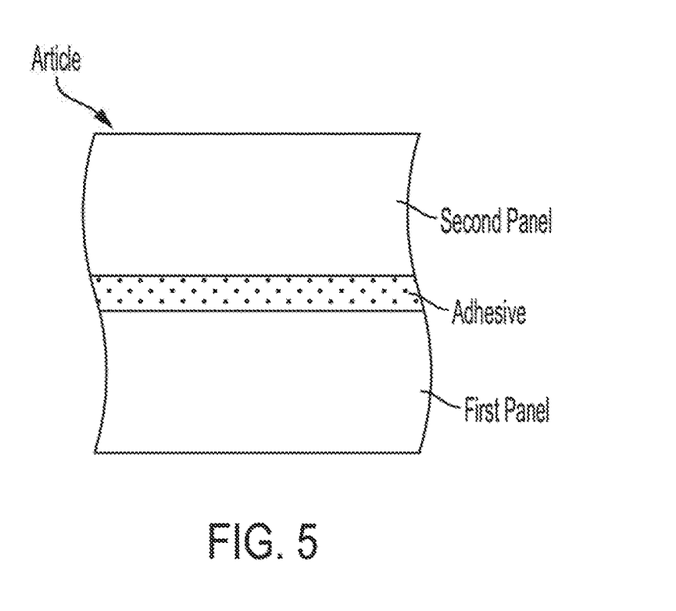
FIG. 5 shows a sectional view of a portion of an exemplary article comprising at least two components adhesively bonded to each other, with at least one of the at least two components comprising the fiber-reinforced resin composite in accordance with various embodiments of the present invention.

FIG. 5 shows a sectional view of a portion of an exemplary article comprising a composite panel, in accordance with various embodiments of the present invention. The exemplary composite panel includes two components, a first component adhesively bonded to a second component, where at least one of the first component or the second component includes the electrically conductive sized fiber reinforcement of the present disclosure and a binder.

Figure 6:
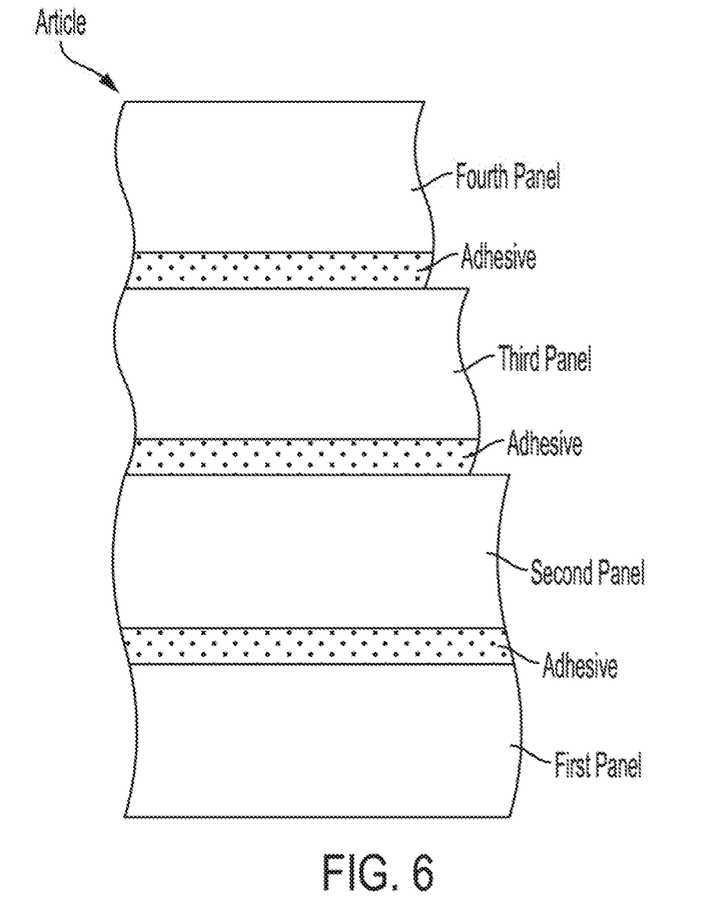
FIG. 6 shows a sectional view of a portion of another exemplary article comprising a composite panel, in accordance with various embodiments of the present invention.

FIG. 6 shows a sectional view of a portion of another exemplary article comprising a composite panel comprising a plurality of panels adhesively bonded to each other, such that at least one of the plurality of panels includes the electrically conductive sized fiber of the present disclosure. As shown in FIG. 6, the exemplary composite panel comprises at least four panels, a first panel is adhesively bonded to a second panel, the second panel adhesively bonded to a third panel and the third panel adhesively bonded to a fourth panel. In an embodiment, the panels are stacked on top of each other such that at least one edge is slanted and has a slope.

The composite panels of the present invention can have any suitable thickness, such as in the range of 0.5-30 mm.

Figure 7:
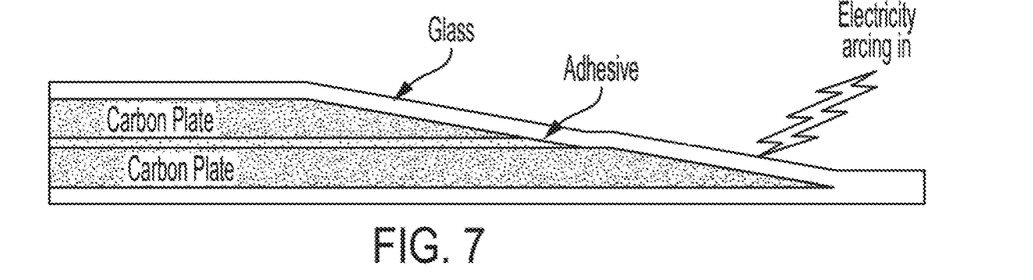
FIG. 7 shows a schematic sectional diagram of a portion of a spar cap.

In an embodiment, the article is a spar cap including a fiber-reinforced resin composite and configured to distribute high energy electricity and reduce arcing or delamination when exposed to the high energy electricity. The spar cap includes the fiber-reinforced resin composite, as disclosed hereinabove, including, an electrically conductive sized fiber reinforcement and a binder resin. FIG. 7 shows a schematic sectional diagram of a portion of a spar cap.

In an embodiment of the spar cap, the fiber-reinforced resin composite comprises 20-80% by volume of electrically conductive sized carbon fibers fused and a binder resin, wherein the amount in % by volume is based on the total volume of the fiber-reinforced resin composite. In an embodiment, the fiber-reinforced resin composite sheet includes 20-80% by volume of electrically conductive sized carbon in fibers fused with a vinyl ester resin. In another embodiment, the fiber-reinforced resin composite sheet includes 20-80% by volume of electrically conductive sized carbon fibers fused with an epoxy resin. In yet another embodiment, the fiber-reinforced resin composite sheet includes 20-80% by volume of electrically conductive sized fiber reinforcement fused with a polyester resin. In yet another embodiment, the fiber-reinforced resin composite sheet in the spar cap is a pultruded sheet comprising 40-80%, or preferably 60-72%, by volume of electrically conductive sized fiber, based on the total volume of the fiber-reinforced resin composite It is believed that the inclusion of the graphene oxide nanoparticles in the electrically conductive sized fiber substantially enhances the electrical conductivity of the fiber-reinforced resin composite in the transverse direction. The resulting spar cap of the present invention will be far more lightning resistant in comparison to one without electrically conductive graphene oxide nanoparticles into the sizing of the fiber.

The introducing of electrically conductive graphene oxide nanoparticles into the sizing of the fiber, in accordance with the present invention provides several advantages:

Since sizing is a standard process performed on fibers now, the inclusion of the electrically conductive graphene oxide nanoparticles to the sizing bath provides a simple effective, low cost introduction process, and further provides advantage of minimal waste.

Graphene oxide-sized fibers can be incorporated into any existing composite material manufacturing process without significantly altering the process parameters.

The inclusion of electrically conductive graphene oxide nanoparticles sizing increases electrical and thermal conductivity and provides greater resin-dominated mechanical properties like inter-laminar shear and transverse strength.

More specifically, the following represents particular embodiments of the invention:

1. An electrically conductive sized fiber comprising:
   a fiber, and
   a sizing composition adhered to a surface of the fiber, wherein the sizing composition comprises at least one sizing compound and a plurality of graphene oxide nanoparticles.
2. The electrically conductive sized fiber according to embodiment 1, wherein the fiber is a carbon fiber.
3. The electrically conductive sized fiber according to embodiment 1 or embodiment 2, wherein the graphene oxide nanoparticles are in the form of graphene oxide nanoplatelets.
4. The electrically conductive sized fiber according to any one of embodiments 1-3, wherein the graphene oxide nanoparticles are encapsulated by the at least one sizing compound and adhered to the surface of the fiber.
5. The electrically conductive sized fiber according to embodiment 4, wherein the graphene oxide nanoparticles are adhered to the surface of the fiber as individual nanoparticles and/or as clusters of nanoparticles.
6. The electrically conductive sized fiber according to any one of embodiments 1-5, wherein the fiber is in the form of a dry tow, a fabric, a felt, a scrim, a prepreg, a pultruded sheet, or a sheet molding compound.
7. A method comprising the steps of:
   (a) coating a sized or an un-sized fiber tow with the sizing composition by drawing the sized or the un-sized fiber tow through a sizing bath containing the sizing composition such that the sized or the un-sized fiber tow is immersed in the sizing composition to form a coated fiber tow, the sizing composition contained in the sizing bath comprising at least one sizing compound and a plurality of graphene oxide nanoparticles;
   (b) drying the coated fiber tow to form an electrically conductive sized fiber tow including the fiber and the sizing composition adhered to a surface of the fiber; and
   (c) spooling the electrically conductive sized fiber.
8. The method according to embodiment 7 further comprising forming a fiber-reinforced resin composite in the form of a pultruded sheet, a resin-infused fabric, sheet molding compound, or a pre-impregnated tape.
9. The method according to embodiment 8, wherein the step of forming a fiber-reinforced resin composite comprises:
   a) arranging the electrically conductive sized fiber into a fabric; and
   b) infusing the fabric with a binder resin to form a resin infused fabric or a prepreg.
10. The method according to embodiment 8, wherein the step of forming a fiber-reinforced resin composite comprises:
    a) arranging the electrically conductive sized fiber into a planar tow form; and
    b) infusing the planar tow form with a binder resin; and
    c) pultruding the resin infused planar tow form to form a pultruded sheet.
11. The method according to embodiment 8, wherein the step of forming a fiber-reinforced resin composite comprises:
    a) compounding at least one of a plurality of chopped or a plurality of continuous electrically conductive fibers with a binder resin; and
    b) compression molding or injection molding the resulting composition into an article.
12. The method according to embodiment 8, wherein the step of forming a fiber-reinforced resin composite comprises:
    a. arranging a combination of electrically conductive sized fiber and fabric made with electrically conductive sized fiber into a structural cross section form;
    b) infusing the structural cross section form with a binder resin; and
    c) pultruding the resin infused section form to result in a pultruded structural section
13. The method according to any one of embodiments 8-12 further comprising forming an article by adhesively bonding at least two components to each other, wherein at least one of the at least two components comprises the fiber-reinforced resin composite.
14. A fiber-reinforced resin composite comprising:
    a) an electrically conductive sized fiber reinforcement including
       i) a fiber, and
       ii) a sizing composition adhered to a surface of the fiber, wherein the sizing composition includes at least one sizing compound and a plurality of graphene oxide nanoparticles; and
    b) a binder resin.
15. The fiber-reinforced resin composite according to embodiment 14, wherein the fiber is a carbon fiber.
16. The fiber-reinforced resin composite according to embodiment 14, wherein the composite is in the form of a pultruded sheet, a resin-infused fabric, a pre-impregnated tape, or a sheet molding compound.
17. The fiber-reinforced resin composite according to embodiment 16, wherein the pultruded sheet comprises carbon fibers in a planar tow form fused with the binder resin.

18. The fiber-reinforced resin composite according to embodiment 16, wherein the fabric comprises a multidirectional fabric, a unidirectional fabric or a woven fabric.
19. The fiber-reinforced resin composite according to embodiment 16, wherein the pre-impregnated tape comprises a preimpregnated unidirectional sheet of fibers or a preimpregnated fabric, where the fabric is one or more of a multidirectional fabric, a unidirectional fabric or a woven fabric.
20. The fiber-reinforced resin composite according to embodiment 16, wherein the sheet molding compound comprises plurality of continuous or discontinuous carbon fibers, a multidirectional fabric, a unidirectional fabric, a woven fabric, or a non-woven fabric, combined with a binder resin.
21. The fiber-reinforced resin composite according to any one of embodiments 14-20, wherein the binder resin comprises a thermosetting binder resin chosen from among unsaturated polyesters, epoxy resins, vinyl ester resins, phenolic resins, thermoset polyurethanes, polyimides, bismaleimide resins, benzoxazine resins, and silicone resins.
22. The fiber-reinforced resin composite according to any one of embodiments 14-20, wherein the binder resin comprises a thermoplastic binder resin chosen from among polyolefins, cyclic polyolefins, acrylonitrile butadiene styrene, polyvinyl chloride, polystyrene, thermoplastic polyesters, polyvinyl alcohols, polymethyl methacrylates, styrene maleic anhydrides, polyoxymethylene (acetals), thermoplastic polyurethanes, polyethylene terephthalates, polytrimethylene terephthalates, polybutylene terephthalates, polyamides, polycarbonates, polyvinylpyrrolidone, polytetrafluoroethylene, polysulfones, polyethersulfones, polyphenylene sulfides, polyetherimides, polyamide-imides, polyetheretherketones, and polyaryletherketones, including alloys and blends.
23. The fiber-reinforced resin composite according to any one of embodiments 14-22 comprising at least one of:
  a) 40-80% by volume of electrically conductive sized fiber reinforcement and a vinyl ester resin, or
  b) 40-80% by volume of electrically conductive sized fiber reinforcement and a polyester resin, or
  c) 40-80% by volume of electrically conductive sized fiber reinforcement and an epoxy resin,
  wherein the amount in % by volume is based on the total volume of the fiber-reinforced resin composite.
24. An article comprising at least two components adhesively bonded to each other, wherein at least one of the at least two components comprises the fiber-reinforced resin composite according to any one of embodiments 14-23.
25. A spar cap comprising a fiber-reinforced resin composite comprising:
  a) an electrically conductive sized fiber reinforcement including
    i) a fiber, and
    ii) a sizing composition adhered to the surface of the fiber, wherein the sizing composition comprises at least one sizing compound and a plurality of graphene oxide nanoparticles; and
  b) a binder resin.
26. The spar cap according to embodiment 25, wherein the fiber-reinforced resin composite comprises 20-80% by volume of electrically conductive sized carbon fibers fused and a binder resin, wherein the amount in % by volume is based on the total volume of the fiber-reinforced resin composite.
27. The spar cap according to embodiment 25, wherein the fiber-reinforced resin composite sheet comprises 20-80% by volume of electrically conductive sized carbon fibers and a vinyl ester resin.
28. The cap according to embodiment 25, wherein the fiber-reinforced resin composite sheet comprises 20-80% by volume of electrically conductive sized carbon fibers and an epoxy resin.

The invention will be further explained by the following Examples, which are intended to be purely exemplary of the invention, and should not be considered as limiting the invention in any way.

Example

Materials used:
ZOLTEK PX-35 carbon fiber bundle (having carbon size diameter of ~7 μm in diameter) were obtained from Zoltek Corporation. Edge-Oxidized Graphene Oxide (EOGO), graphene oxide nanoplatelets (with carboxylic and hydroxyl groups) available as 1 weight % dispersion in water were obtained Garmor, Inc. (Orlando, Fla.). EOGO used herein had a composition of 90-95% carbon and corresponding 5-10% oxygen present in the form of carboxyl groups and hydroxyl groups, without the other impurities, and was produced by wet milling process. The graphene oxide nanoplatelets were used as is except the dispersion was sonicated before use to redisperse graphene oxide nanoparticles in water.

Testing Methods:
For the sizing, % solids was determined by moisture balance @ 120° C. until there was no change in weight.
For the fiber, % moisture was determined by weighing before and after in heating at 2 hours in oven @ 105° C.; % size content was determined by weighing before and after solvent extraction; tow mass (g/m) was based on weight of 1 m long sample; and fuzz (ppm) was determined by dragging the fiber across a rough surface and weighing before and after.
Electrical conductivity was measured on a composite plate made of conductively sized carbon fiber and a thermoset resin with a PROSTAT PRS-801 resistance system set. Measurement methods followed the industry standard tests ANSI/ESD STM11.11 to measure surface resistance, and ANSI/ESD STM11.12 to measure volume resistance Basic Process:
FIG. 2 shows an overall process of making an electrically conductive sized fiber. The process included the following steps:
The graphene oxide dispersion was re-sonicated for 15 minutes before adding to a general purpose epoxy-compatible sizing composition including at least one sizing compound. Then, the un-sized carbon fiber bundle (called a tow) was run through a bath of sizing which contained typical sizing compounds used for carbon fibers plus the inclusion of Graphene-oxide (GO) nano-platelets. Standard conditions, as would be used for sizing composition with graphene oxide nanoplatelets, but the amount of sizing deposited on the fiber was controlled through adjustment of the sizing concentration in the bath. The wetted, sized tow was then pulled through a set of nip rolls set at 50 psi to reduce the moisture content to a target of 20%. The wetted, sized fiber tow was then dried at 180° C. for 5 minutes under air and wrapped up on a spool.

The sizing composition with graphene oxide was found to be stable with solids constant over weekend and even one-week old sample appeared relatively stable, as shown in FIG. 4. Some graphene oxide nanoparticles were found to settle to the bottom immediately, probably due to lack of functionalization.

Figure 1:
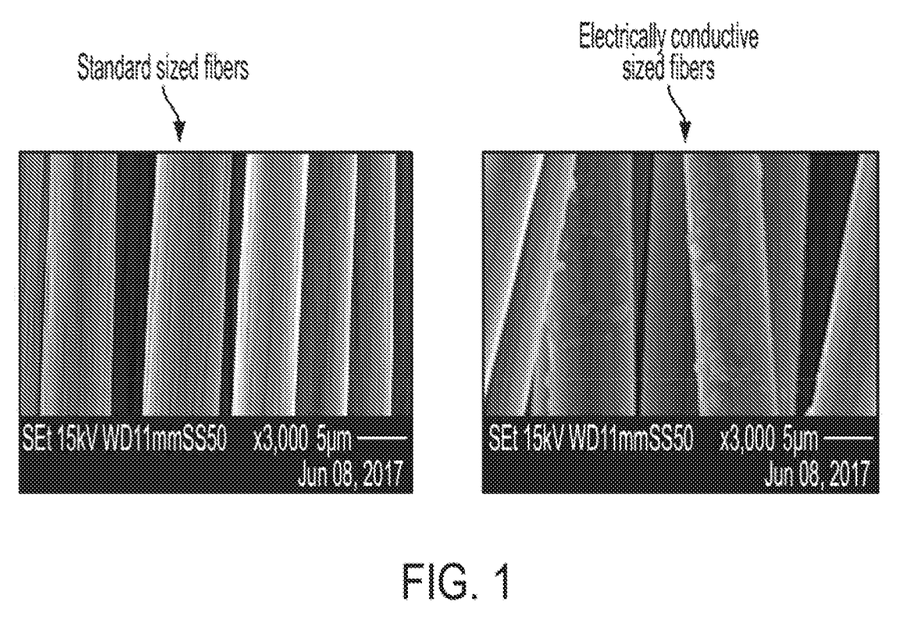
FIG. 1 shows scanning electron micrographs of a standard sized fiber tow and an electrically conductive sized fiber tow (10 weight % graphene oxide, based on the total amount of sizing composition; 0.15 weight % total sizing on the fiber), in accordance with various embodiments of the present invention.

FIG. 1 shows scanning electron microscopy (SEM) micrographs of an electrically conductive sized fiber tow comprising 10 weight % graphene oxide, based on the total amount of sizing composition; with 0.15 weight % total sizing on the fiber in comparison to the standard sized fibers with no graphene oxide nanoplatelets. FIG. 1 shows that that graphene oxide nanoparticles are encapsulated and stuck to the fiber surface. Some platelets are individual and some are "clumped" together into larger bundles.

It will be apparent to those skilled in the art that various modifications and variations can be made in the practice of the present invention without departing from the scope or spirit of the invention. Other embodiments of the invention will be apparent to those skilled in the art from consideration of the specification and practice of the invention. It is intended that the specification and examples be considered as exemplary only, with a true scope and spirit of the invention being indicated by the following claims.

What is claimed:

1. An electrically conductive sized fiber comprising:
a fiber, and
a sizing composition adhered to a surface of the fiber, wherein the sizing composition comprises at least one sizing compound and a plurality of graphene oxide nanoparticles having a particle size distribution in the range of 200 nm to 1 μm.

2. The electrically conductive sized fiber according to claim 1, wherein the fiber is a carbon fiber.

3. The electrically conductive sized fiber according to claim 1, wherein the graphene oxide nanoparticles are in the form of graphene oxide nanoplatelets.

4. The electrically conductive sized fiber according to claim 1, wherein the graphene oxide nanoparticles are encapsulated by the at least one sizing compound and adhered to the surface of the fiber.

5. The electrically conductive sized fiber according to claim 4, wherein the graphene oxide nanoparticies are adhered to the surface of the fiber as individual nanoparticles and/or as clusters of nanoparticies.

6. The electrically conductive sized fiber according to claim 1, wherein the fiber is in the form of a dry tow, a fabric, a felt, or a scrim, or is a component of a prepreg, a pultruded sheet, or a sheet molding compound.

7. A method comprising the steps of:
(a) coating a sized or an un-sized fiber tow with a sizing composition by drawing the sized or un-sized fiber tow through a sizing bath containing the sizing composition such that the sized or the un-sized fiber tow is immersed in the sizing composition to form a coated fiber tow, wherein the sizing composition contained in the sizing bath comprises at least one sizing compound and a plurality of graphene oxide nanoparticles having a particle size distribution in the range of 200 nm to 1 μm;
(b) drying the coated fiber tow to form an electrically conductive sized fiber including the fiber and the sizing composition adhered to a surface of the fiber; and
(c) spooling the electrically conductive sized fiber.

8. The method according to claim 7 further comprising forming a fiber-reinforced resin composite in the form of a pultruded sheet, a resin-infused fabric, sheet molding compound, or a pre-impregnated tape.

9. The method according to claim 8, wherein the step of forming a fiber-reinforced resin composite comprises:
a) arranging the electrically conductive sized fiber into a fabric; and
b) infusing the fabric with a binder resin to form a resin infused fabric or a prepreg.

10. The method according to claim 8, wherein the step of forming a fiber-reinforced resin composite comprises:
a) arranging the electrically conductive sized fiber into a planar tow form; and
b) infusing the planar tow form with a binder resin; and
c) pultruding the resin infused planar tow form to form a pultruded sheet.

11. The method according to claim 8, wherein the step of forming a fiber-reinforced resin composite comprises:
a) compounding at least one of a plurality of chopped or plurality of continuous electrically conductive fibers with a binder resin; and
b) compression molding or injection molding the resulting composition into an article.

12. The method according to claim 8, wherein the step of forming a fiber-reinforced resin composite comprises:
a) arranging a combination of electrically conductive sized fiber and fabric made with electrically conductive sized fiber into a structural cross section form;
b) infusing the structural cross section form with a binder resin; and
c) pultruding the resin infused section form to result in a pultruded structural section.

13. A method comprising the steps of:
(a) coating a sized or an un-sized fiber tow with a sizing composition by drawing the sized or the ,un-sized fiber tow through a sizing bath containing the sizing composition such that the sized or un-sized fiber tow is immersed in the sizing composition to form a coated fiber tow, wherein the sizing composition contained in the sizing bath comprises at least one sizing compound and a plurality of graphene oxide nanoparticles;
(b) drying the coated fiber tow to form an electrically conductive sized fiber tow including the fiber tow and the sizing composition adhered to a surface of the fiber tow;
(c) spooling the electrically conductive sized fiber tow;
(d) forming a fiber-reinforced resin composite in the form of a pultruded sheet, a resin-infused fabric, sheet molding compound, or a pre-impregnated tape; and
(e) forming an article by adhesively bonding at least two components to each other, wherein at least one of the at least two components comprises the fiber-reinforced resin composite.

14. A fiber-reinforced resin composite comprising:
a) an electrically conductive sized fiber reinforcement including
i) a fiber, and
ii) a sizing composition adhered to a surface of the fiber, wherein the sizing composition includes at least one sizing compound and a plurality of graphene oxide nanoparticies having a particle size distribution in the range of 200 nm to 1 μm; and
b) a binder resin.

15. The fiber-reinforced resin composite according to claim 14, wherein the fiber is a carbon fiber.

16. The fiber-reinforced resin composite according to claim 14, wherein the composite is in the form of a pultruded sheet, a resin-infused fabric, a pre-impregnated tape, or a sheet molding compound.

17. The fiber-reinforced resin composite according to claim 16, wherein the pultrud d sheet comprises carbon fibers in a planar tow form fused with the binder resin.

18. The fiber-reinforced resin composite according to claim 16, wherein the fabric comprises a multidirectional fabric, a unidirectional fabric or a woven fabric.

19. The fiber-reinforced resin composite according to claim 16, wherein the pre-impregnated tape comprises a preimpregnated unidirectional sheet of fibers or a preimpregnated fabric, where the fabric is one or more of a multidirectional fabric, a unidirectional fabric or a woven fabric.

20. The fiber-reinforced resin composite according to claim 16, wherein the sheet molding compound comprises plurality of continuous or discontinuous carbon fibers, a multidirectional fabric, a unidirectional fabric, a woven fabric, or a non-woven fabric, combined with a binder resin.

21. The fiber-reinforced resin composite according to claim 14, wherein the binder resin comprises a thermosetting binder resin chosen from among unsaturated polyesters, epoxy resins, vinyl ester resins, phenolic resins, thermoset polyurethanes, polyimides, bismaleirnide resins, benzoxazine resins, and silicone resins.

22. The fiber-reinforced resin composite according claim 14, wherein the binder resin comprises a thermoplastic binder resin chosen from among polyolefins, cyclic polyolefins, acrylonitrile butadiene styrene, polyvinyl chloride, polystyrene, thermoplastic polyesters, polyvinyl alcohols, polymethyl methacrylates, styrene maleic anhydrides, polyoxymethylene (acetals), thermoplastic polyurethanes, polyethylene terephthalates, polytrimethylene terephthalates, polybutylene terephthalates, polyamides, polycarbonates, polyvinyipyrrolidone, polytetrafluoroethylene, polysulfones, polyethersulfones, polyphenylene sulfides, polyetherimides, polyamide-imides, polyetheretherketones, and polyaryletherketones, including alloys and blends.

23. The fiber-reinforced resin composite according to claim 14 comprising at least one of:
 a) 40-80% by volume of electrically conductive sized fiber reinforcement and a vinyl ester resin,
 b) 40-80% by volume of electrically conductive sized fiber reinforcement and a polyester resin, or
 c) 40-80% by volume of electrically conductive sized fiber reinforcement and an epoxy resin,
 wherein the amount in % by volume is based on the total volume of the fiber-reinforced resin composite.

24. An article comprising at least two components adhesively bonded to each other, wherein at least one of the at least two components comprises the fiber-reinforced resin composite, wherein the fiber-reinforced resin composite comprises:
 a) an electrically conductive sized fiber reinforcementincluding
  i) a fiber, and
  ii) a sizing composition adhered to a surface of the fiber, wherein the sizing composition includes at least one sizing compound and a plurality of graphene oxide nanoparticles; and
 b) a binder resin.

25. A spar cap comprising a fiber-reinforced resin composite comprising:
 a) an electrically conductive sized fiber reinforcement including
  i) a fiber, and
  ii) a sizing composition adhered to the surface of the fiber, wherein the sizing composition comprises at least one sizing compound and a plurality of graphene oxide nanoparticles having a particle size distribution in the range of 200 nm to 1 μm; and
 b) a binder resin.

26. The spar cap according to claim 25, wherein the fiber-reinforced resin composite comprises 20-80% by volume of electrically conductive sized carbon fibers and a binder resin, wherein the amount in % by volume is based on the total volume of the fiber-reinforced resin composite.

27. The spar cap according to claim 25, wherein the fiber-reinforced resin composite sheet comprises 20-80% by volume of electrically conductive sized carbon fibers and an epoxy resin.

28. A spar cap co prising a fiber-reinforced resin composite comprising:
 a) 20-80% by volume of an electrically conductive sized fibers including
 i) a fiber, and
 a sizing composition adhered to the surface of the fiber, wherein the sizing composition comprises at least one sizing compound and a plurality of graphene oxide nanoparticles; and
 b) a binder resin comprising a vinyl ester resin.

* * * * *

UNITED STATES PATENT AND TRADEMARK OFFICE
CERTIFICATE OF CORRECTION

| | | |
|---|---|---|
| PATENT NO. | : 11,566,369 B2 | Page 1 of 1 |
| APPLICATION NO. | : 17/041753 | |
| DATED | : January 31, 2023 | |
| INVENTOR(S) | : Steven Eric Baldini | |

It is certified that error appears in the above-identified patent and that said Letters Patent is hereby corrected as shown below:

On the Title Page

Column 2, (57) Abstract, "oxide nanoparticles, The present disclosure also discloses" should read
-- oxide nanoparticles. The present disclosure also discloses --

In the Claims

In Claim 13, Column 14, Line 36, "or the ,un-sized fiber" should read -- or the un-sized fiber --

In Claim 17, Column 15, Line 6, "wherein the pultrud d sheet comprises carbon" should read
-- wherein the pultruded sheet comprises carbon --

In Claim 24, Column 16, Lines 9 and 10, "a) an electrically conductive sized fiber reinforcementincluding" should read -- a) an electrically conductive sized fiber reinforcement including --

In Claim 28, Column 16, Line 38, "A spar cap co prising a fiber-reinforced resin" should read
-- A spar cap comprising a fiber-reinforced resin --

In Claim 28, Column 16, Line 43, "a sizing composition" should read -- ii) a sizing composition --

Signed and Sealed this
Sixteenth Day of May, 2023

Katherine Kelly Vidal
*Director of the United States Patent and Trademark Office*